June 30, 1953  M. A. CHESTER  2,643,544
HARDNESS TESTER
Filed March 23, 1951  5 Sheets-Sheet 2
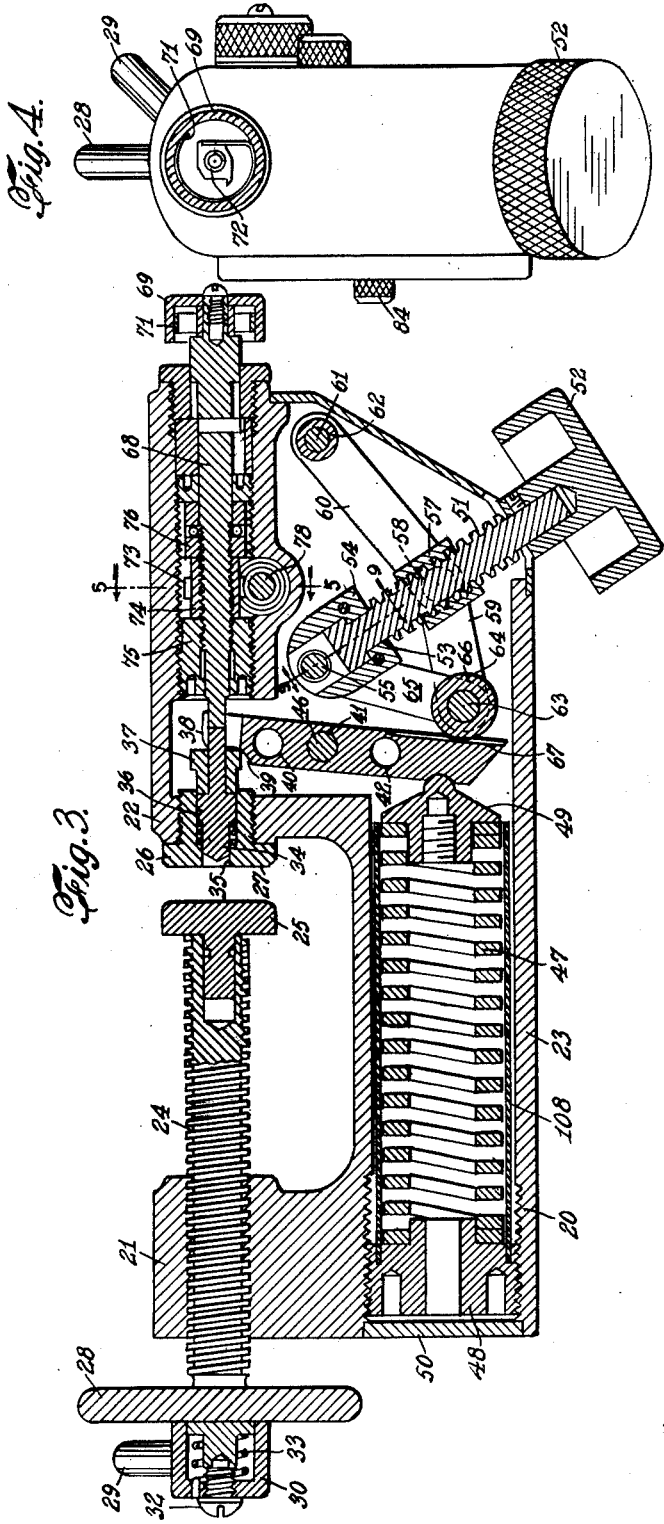
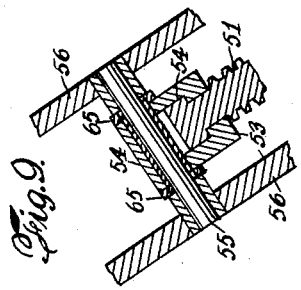
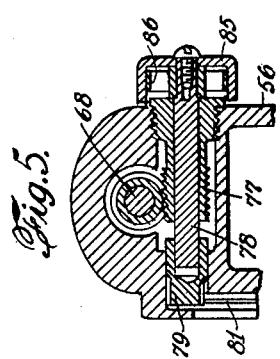
INVENTOR.
MILTON A. CHESTER
BY
*Philip S. Morgan*
ATTORNEY.

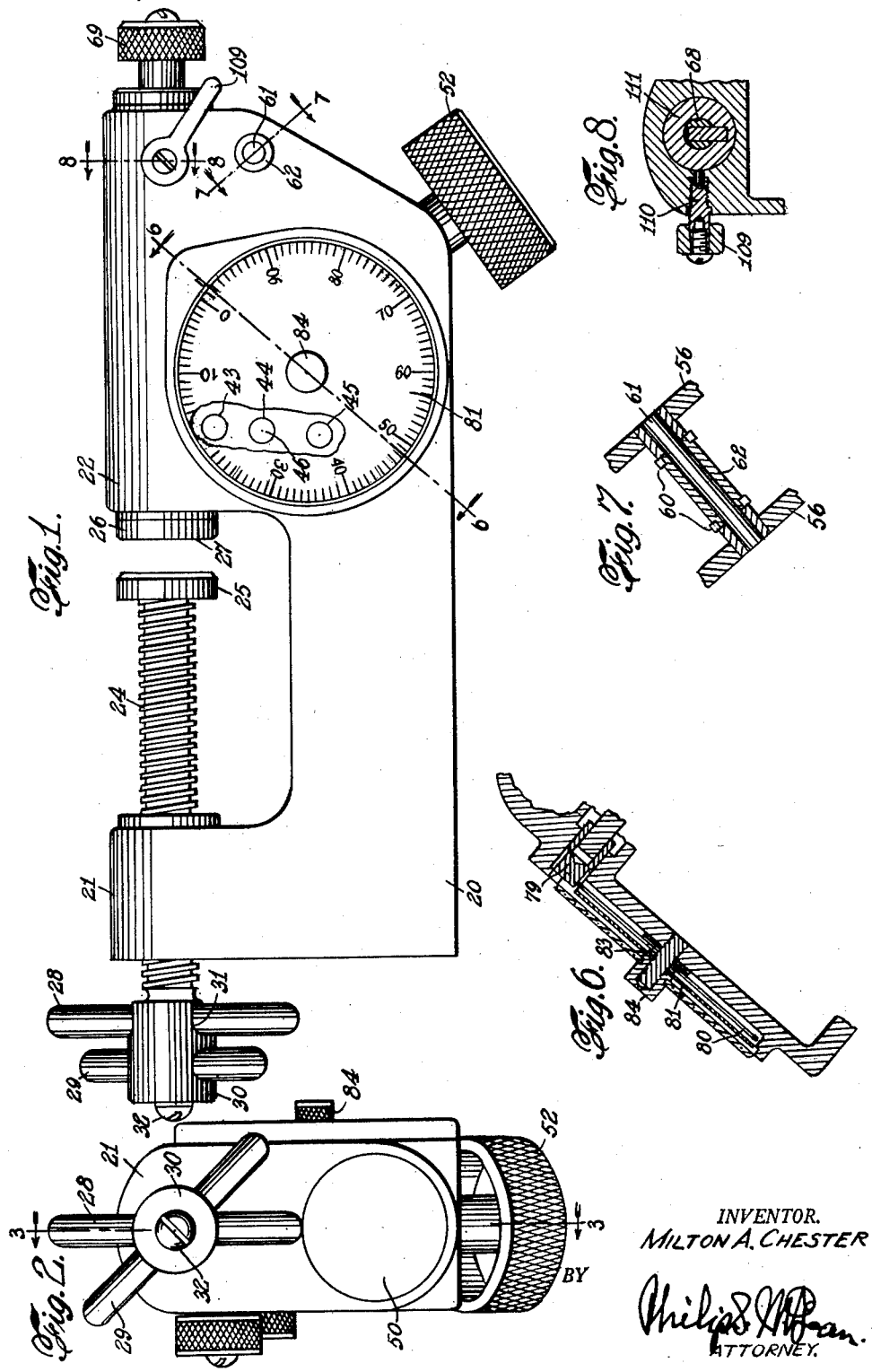
June 30, 1953 — M. A. CHESTER — 2,643,544
HARDNESS TESTER
Filed March 23, 1951 — 5 Sheets-Sheet 1
INVENTOR.
MILTON A. CHESTER
BY
ATTORNEY.

June 30, 1953  M. A. CHESTER  2,643,544
HARDNESS TESTER

Filed March 23, 1951  5 Sheets-Sheet 3

INVENTOR.
MILTON A. CHESTER
BY
ATTORNEY

June 30, 1953  M. A. CHESTER  2,643,544
HARDNESS TESTER
Filed March 23, 1951  5 Sheets-Sheet 4
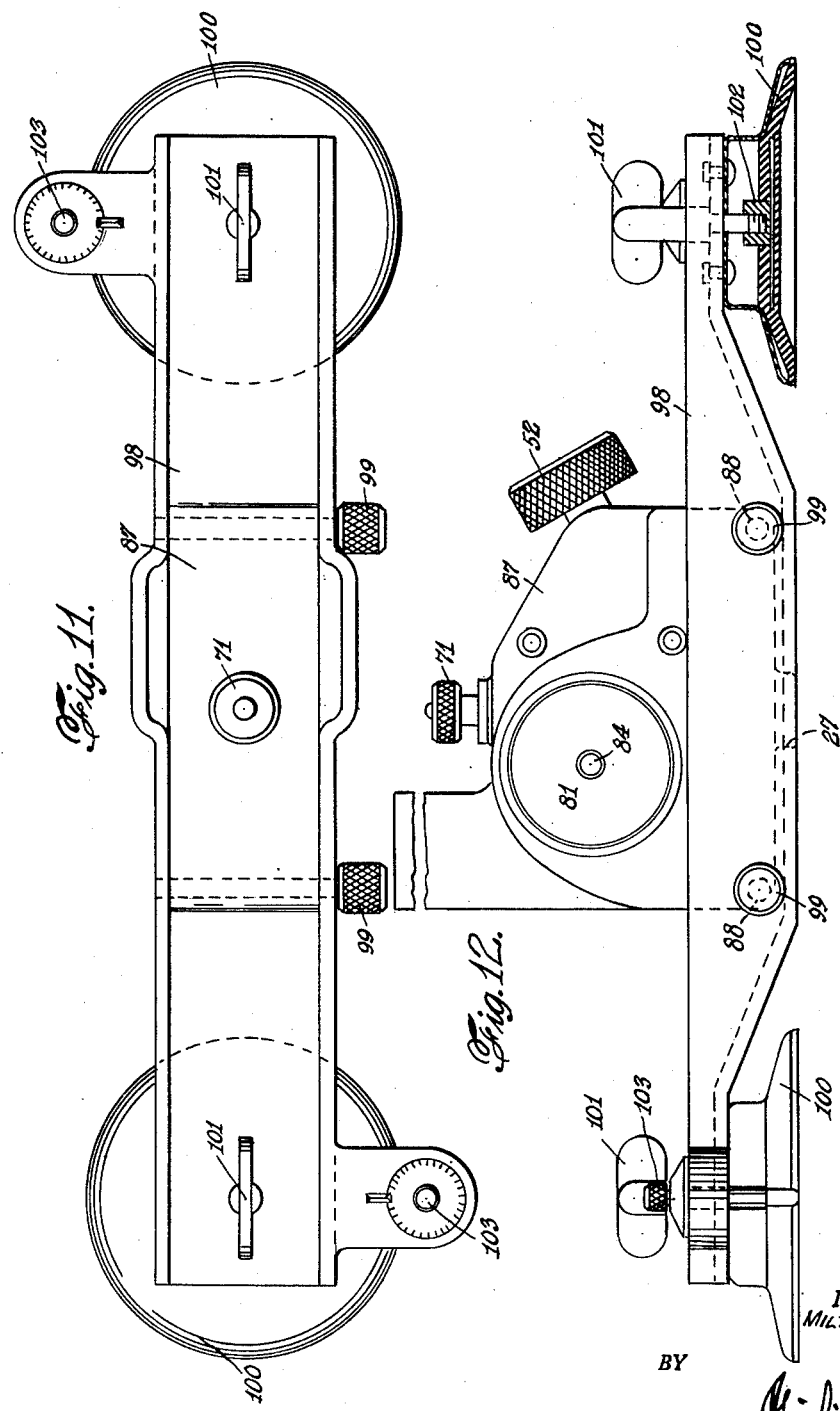
INVENTOR.
MILTON A. CHESTER
BY
ATTORNEY.

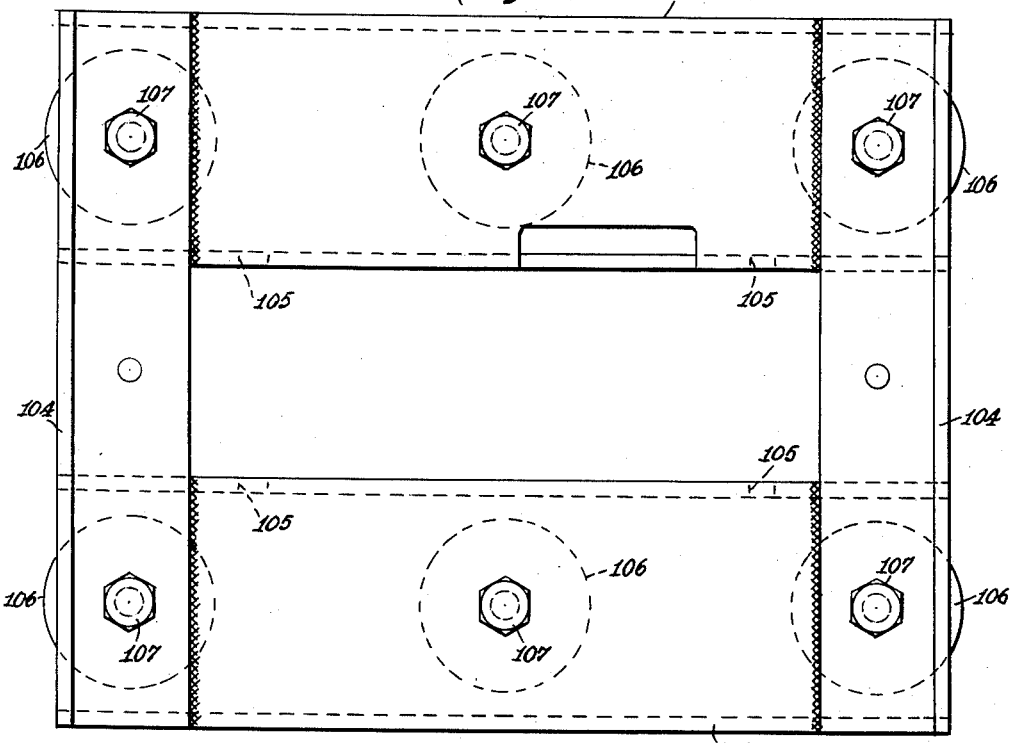
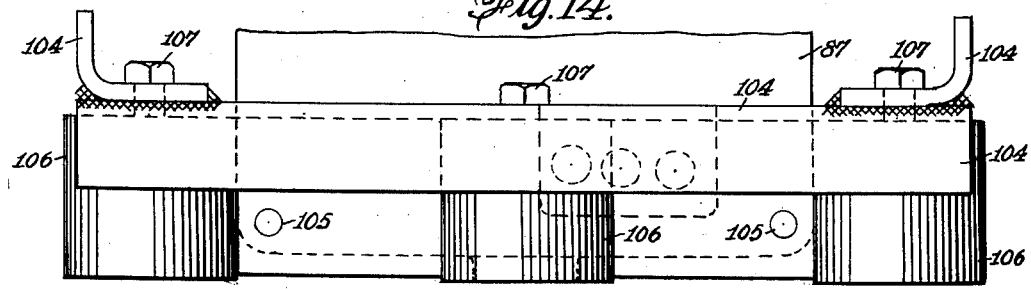
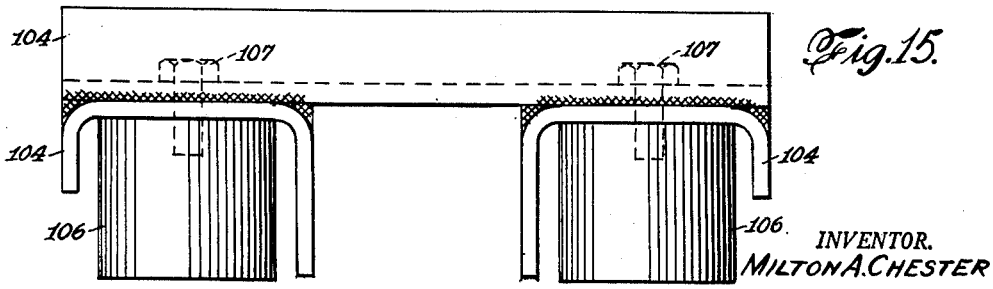

Patented June 30, 1953

2,643,544

UNITED STATES PATENT OFFICE 2,643,544

HARDNESS TESTER

Milton A. Chester, Los Angeles, Calif., assignor to The Development-Research Corporation, Los Angeles, Calif., a corporation of California Application March 23, 1951, Serial No. 217,197

23 Claims. (Cl. 73—81)

The invention disclosed in this patent is an instrument of the type covered in M. A. Chester Patent No. 2,448,486 of August 31, 1948, for testing and determining hardness and other factors, qualities or conditions.

In these instruments measurements are based on the extent of penetration or deflection accomplished by a spring loaded penetrator.

The present invention is concerned to an extent with the spring loading action, and special objects of the invention are to simplify and improve the means for storing and releasing the spring energy and to provide powerful but easily operated means for such purpose which will be of compact design, take up but small space and not project or interfere with the free use and operation of the instrument.

A special object of the invention is to embody the necessary mechanism in universally adaptable forms of construction which may be applied for measurement and testing purposes where only one or where both faces of the test subject is or are accessible, and to supply different means for holding the instrument in position against a test object where only that face of the object is exposed.

Other special objects of the invention are to provide the instrument in a portable form, of simple, rugged construction, adapted for such handling, which will be suited to a great variety of uses and conditions, which will be direct reading in its indicating action and which in making a test or measurement will retain the reading for subsequent observation or consideration.

Further important objects of the invention are to provide the instrument with all these advantages in a simple and entirely practical form of construction which can be produced at reasonable cost.

Other desirable objects and the novel features of construction, combination and relation of parts through which the purposes of the invention are attained, are set forth or will appear in the course of the following specification.

The drawings accompanying and forming part of the specification illustrate present commercial embodiments of the invention. Structure, however, may be modified and changed as regards the immediate illustration, all within the true intent and broad scope of the invention as hereinafter defined and claimed.

Fig. 1 is a side elevation of one of the closed or clamp type forms of the tester;

Fig. 2 is a left-hand end view of the same;

Fig. 3 is a longitudinal sectional view, as taken on substantially the central plane indicated by line 3—3 of Fig. 2;

Fig. 4 is a right-hand end view of the instrument shown in Figs. 1 and 3;

Fig. 5 is a broken vertical cross sectional view as on substantially the plane of line 5—5 of Fig. 3, showing the micrometer dial actuating gearing;

Fig. 6 is a broken cross sectional view across the dial as on substantially the plane of line 6—6 of Fig. 1;

Fig. 7 is a broken cross sectional detail of the toggle anchorage construction as on substantially the plane of line 7—7 of Fig. 1;

Fig. 8 is a broken sectional view across the locking lever structure, on substantially the plane of line 8—8 of Fig. 1;

Fig. 9 is a broken sectional detail of the loading screw anchorage on substantially the plane of line 9—9 of Fig. 3;

Figs. 11 and 12 are plan and side views, respectively, of a form of mounting beam for securing the open type instrument in position over a test surface, this beam held to the object by screw vacuum cups;

Fig. 13 is a plan view of a permanent magnet form of mounting beam; and

Figs. 14 and 15 are side and end views, respectively, of the same.

Figure 10:
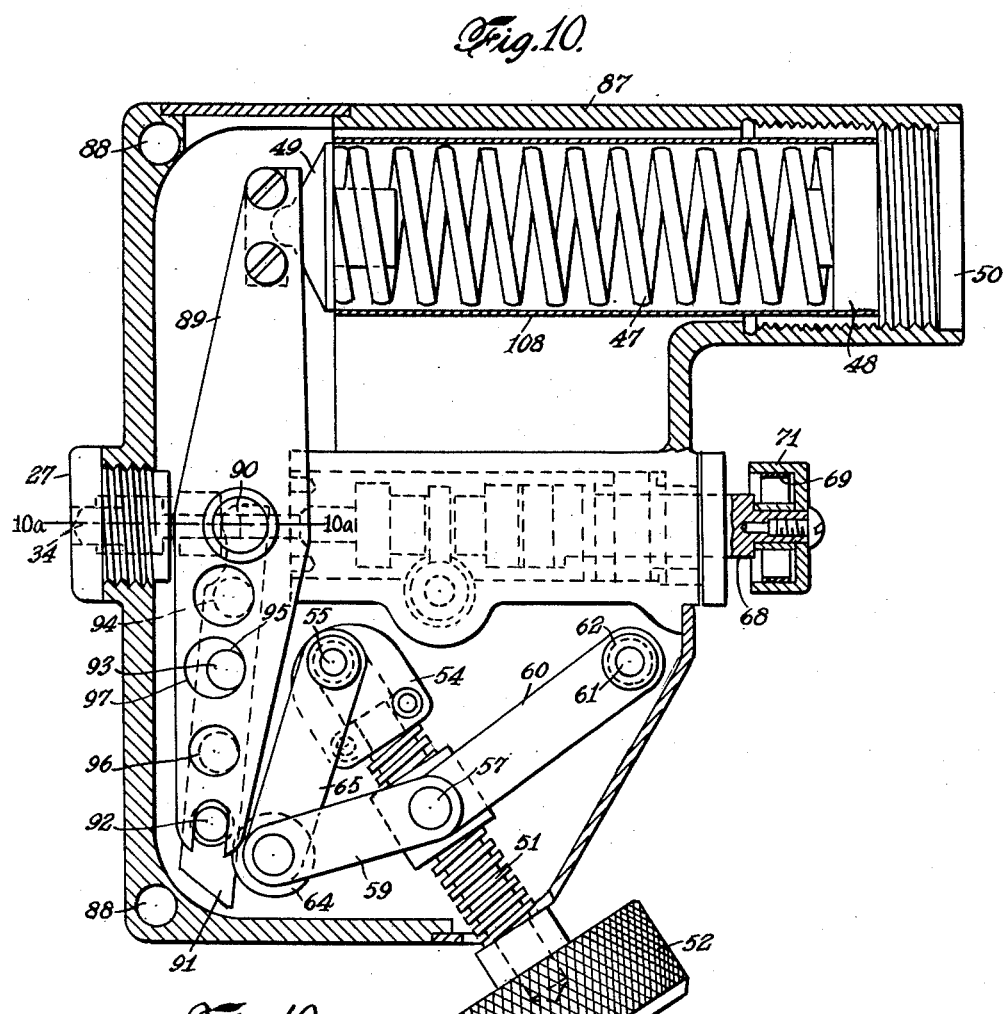
Fig. 10 is a vertical sectional view of one of the open face forms of the invention.

In the embodiment of the invention shown in Figs. 1 to 9, the base or body of the device is in the nature of a beam form of clamp comprising a yoke-like structure or a C frame 20 having spaced arm portions 21, 22, carrying relatively adjustable, companion clamp members and connected by a back portion 23, hollow to contain the spring for applying the test load.

A clamp screw 24 operable through one arm of the frame, carries an anvil piece 25 in cooperative relation with a fixed clamp or anvil piece 26 removably supported in the opposing arm of the frame.

The piece to be tested, in this instance is clamped between the anvil heads 25, 26, constituting the clamping jaws and the fixed anvil member 26 provides a reference face at 27 for the penetrator point.

The clamp screw is shown as having a cross bar form of operating handle 28 and a similar, secondary handle 29 carried by a sleeve 30 rotatably engaged over the outer end of the spindle and slotted at 31 to interlock over the fixed handle, said sleeve being normally held in this engaged relation by an end screw 32, in opposition to the unclutching spring 33 located inside the sleeve, forming a torque wrench for exerting a known force each time.

The anvil or jaw members 25, 26, are shown as having flat faces for engagement with flat material, but these may be specially shaped to engage variously shaped pieces or materials under test.

The penetrator is designated 34 and is shown in the form of a pointed plunger operating through a passage 35 in the fixed anvil member. A light spring 36 is provided to back the penetrator away from the reference face 27 and to hold it with the loose collar 37 thereon engaged with the forked end 38 of the load applying lever 39.

In the present invention provision is made for fulcruming the lever 39 on different centers to vary the leverage ratio and hence the penetrating power actually applied by the spring.

In the illustration the lever has three fulcrum openings 40, 41, 42, and the hollow casing form of frame in which the lever is contained has correspondingly positioned openings 43, 44, 45, to receive a fulcrum pin 46.

In practice two fulcrum pins 46 may be provided with the instrument so that the second pin may be inserted into service position before the first fulcrum pin is removed from its position of previous use.

The load spring is designated 47 and is shown located in the hollow back portion 23 of the frame, backed up by the tension adjusting screw plug 48 at one end and carrying a load applying plug 49 at the opposite end in free swiveling engagement with the loading end of the lever.

To prevent unauthorized adjustment of the tensioning plug 48, the latter may be protected by a cover disc 50.

Loading and unloading of the spring is effected in the present invention by a hand screw 51 having a handle knob 52 on its outer end and swiveled at its inner end at 53 in an anchor block 54 swiveled over a pin 55, Fig. 9, secured in the side walls 56 of the case.

On the intermediate portion of loading screw 51 a nut block 57 is engaged, carrying fulcrum studs 58 on opposite sides forming the center hinge connection for the relatively short and long toggle links 59 and 60.

The longer toggle links 60 in spaced relation at opposite sides of the nut block 57, are pivoted at their outer, fixed ends on a stationary stud or pin 61, Fig. 7, through the medium of a spacer sleeve 62.

The outer ends of the shorter toggle links 59 are pivotally connected at 63 with a roller 64 bearing on the lever 39 in opposition to the loading spring, and by links 65 with the anchorage pivot 55 for the screw.

Fig. 9 shows how the connecting links 65 are pivotally engaged on the anchorage stud 55 at opposite sides of the anchorage head 54 for the screw.

The roll 64 at the free end of the toggle for applying the toggle straightening thrust to the spring lever is shown as centered in rolling engagement over the lever by having its ends beveled at 66 to track in the bevel edge groove 67 in the back of the lever.

Fig. 3 shows the toggle in a partly straightened condition holding the spring 47 compressed and with the forked end 38 of lever 39 backed off from the penetrator and the latter retracted by spring 36 from reference face 27.

It will be evident that upon turning the hand knob 52 in the screwing or clockwise direction the toggle will "break" or buckle to take away pressure of the roll 63 from lever 39 and permit spring 47 to advance the penetrator 36.

By turning knob 52 in the opposite direction the toggle will be "straightened" to force back the spring through the intermediacy of lever 39, and thus take the load off the penetrator and permit the spring 36 to retract the penetrator from the reference face.

Initial setting of the penetrator in respect to the reference face and the material under test, is effected in the illustration by a screw spindle 68 journaled in back of and in line with the penetrator spindle and operable by an exposed knob 69.

The latter is shown as a hollow thimble journaled on the outer end of the screw spindle and having the angular flange or rim portion 70 on the same engaged by an arcuate length of a spring 71 fixed at the inner end at 72 to the outer end portion of the spindle.

This structure provides a simple but effective slip clutch for effecting the finer or sensitive adjustments of the screw spindle necessary to set the penetrator into firm, positive contact with the work.

An alternate load-limiting means used is a leaf spring expandably held in the circumference of the knob and operating over a rise and fall cam fastened to the spindle axis.

The screw seat for the follower spindle 68 is provided in the illustration at 73 in a worm gear 74 held between thrust bearings 75, 76, and operable by a worm 77, Fig. 5, carried by a spindle 78 journaled across the upper part of the casing and carrying a pinion 79, Fig. 6, in mesh with a gear 80 carrying over the face of the same the dial 81.

The gear 80 and the dial 81 rotated thereby are shown as held on the supporting spindle 82 by a snap ring 83. A knob 84 at the center of the dial provides a convenient hand hold for taking off or replacing the same.

The worm shaft 78 is adjusted, in the illustration, by a thimble 85 on the outer, exposed end of this shaft, having an enclosed clutch spring 86 similar to the follower thimble 69.

Constructed as disclosed, the instrument may be made small and light enough for ready portability and the screw toggle loading and unloading of the power spring constitutes a small, compact, powerful unit which can be quickly and easily operated and which, aside from the operating knob, does not protrude beyond the outlines of the case or frame of the instrument.

In use the piece to be tested is firmly gripped in the clamping jaws and with the toggle in the spring holding position shown in Fig. 3, the thimble 69 is turned to cause the follower screw 68 to advance the penetrator 34 into engagement with the work piece or material to be tested at the plane of the reference face 27.

The energy stored up in the spring may then be released by turning the knob 52 in the screwing direction, permitting buckling action of the toggle and application of the known, constant load afforded by the spring to penetration and deflection purposes.

The extent and values of such effects may then be instantly ascertained by rotating thimble 69 to advance the follower 68 sufficiently to contact the penetrator 34 in its advanced position. In such advancing movement the dial 81 will be turned correspondingly or proportionately through the pinion and gear operating connections 79, 80, to show the extent or value of such penetration or deflection, providing a direct reading which will remain with the dial at rest even after the instrument has been removed from the material or the test piece has been separated from the instrument and until the dial has been reset by turning its operating knob.

The dial may be calibrated to degrees of hardness, strength or other values as suited to particular needs, and different dials suited to particular purposes may be substituted as required.

These measurements and values are related to the character and effect of the penetrator, and different kinds and characters of penetrators may be substituted accordingly. Actually a flat, ball or other form of "zero" penetrator may be used in place of sharpened or pointed forms, designed to indicate values of bending, bearing, wall thickness and the like through deflection relative to the beam structure of the instrument.

In cases where it is impossible to apply pressure to opposite sides of the test object, the open form of construction illustrated in Fig. 10 may be employed, involving the same screw toggle operation but incorporated in a casing 87 having the reference face 27, Fig. 10, projecting and exposed and adapted to be held in contact with the test surface by fastenings passed through or engaged in openings 88 in such casing.

While the screw toggle mechanism may be the same and, in fact, identical and interchangeable with that mechanism in the first form of the invention disclosed, the load spring is made to apply its effort in the opposite direction from that first disclosed, through the medium of a substantially one-to-one lever system which will translate the working load to the penetrator in the same manner and magnitude.

Figure 10A:
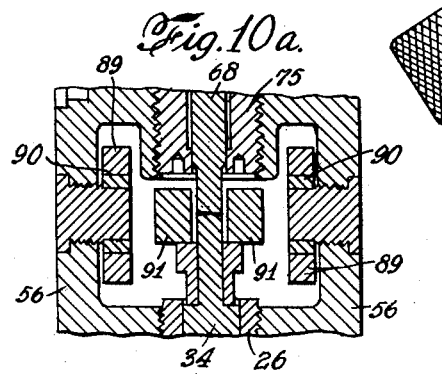
Fig. 10a is a broken sectional detail on line 10a—10a of Fig. 10.

The load lever in this instance is shown as consisting of parallel sections 89 fulcrumed midlength at 90, Fig. 10a, on the side walls of the casing and having the lever 91 fulcrumed at 92 between the far ends of the same and which latter lever operates on the fulcrum pin 93 which can be selectively engaged in any one of the three fulcrum openings 94, 95, 96. The parallel levers 89 have openings 97 therethrough large enough for clear operating passage of the fulcrum pin 93 which has its support in the side walls of the casing.

This form of the tester may be clamped to the work in a variety of ways. For example, a simple mechanical attachment may be effected by drilling and threading the work surface and bolting the instrument in place. Permanent or electro-magnets of sufficient holding power to resist the applied load may be employed, or suction cups of sufficient area to provide a total holding force in excess of the applied load. A cable or other flexible sling may be used where it is necessary to go around large parts to hold the instrument in place.

Figs. 11 and 12 show a form of beam 98 hollowed at the center to form a cradle to receive the instrument case 87 and having openings for the securing pins 99 which are passed through the openings 88 in the bottom of the case. Suction cups 100 fastened to opposite ends of the beam and operable by the screws 101, supply the necessary holding force.

In using this embodiment the evacuating screws are first released from the diaphragms. Pressure is then applied to force the air out of the diaphragms.

The evacuating screws are then engaged in the threaded portions 102 and tightened as much as need be to effect firm attachment and solid engagement of the reference face 27 against the surface under test.

The two micrometer screws 103 at the ends of the beam may then be adjusted into contact with the surface, and the readings noted. The constant spring test load is then applied to the work by turning the hand knob 52 in the screwing direction as above described and the dial reading taken. The micrometer screws may then be adjusted into contact with the surface and the deflection of the diaphragms determined by the difference in the two micrometer screw readings. This reading is subtracted from the dial reading to obtain the deflection of the work. The deflection of the beam itself is a calibrated factor.

Figs. 13, 14 and 15 illustrate a beam or base structure 104 constructed to receive the instrument casing, having openings 105 through which the mounting pins 99 may be passed and carrying a group of powerful permanent magnets 106. These magnets may be loosely held by bolts 107 so as to adapt themselves to the surface of the work, the bolts being tightened after the magnets have made full contact with the work surface.

A powerful electromagnet or electromagnets may be used in place of the permanent magnets.

The load spring 47 may be enclosed within a protective tube, as indicated at 108, Fig. 3.

A lock lever is shown at 109, Figs. 1 and 8, for turning a lock screw 110 into holding engagement with the bearing bushing 111 which turns with the follower spindle 68.

The plural locations for the fulcrum pin of the load lever provide for loads of several magnitudes in one instrument without any adjustment or alteration in the initial established compression or stored energy of the load spring. These changes in mechanical advantages change the load applied by the lever with no change in the load applied to it.

The screw toggle is quickly and easily operable without disturbing the position of the instrument in respect to the work. Instead of a hand knob, it may be operated by a hand crank or the like. The parts designed and combined as illustrated are largely free from friction and wear so that the instrument will continue accurate and reliable.

The self-locking characteristics of the worm and worm gear employed for adjusting the follower and actuating the dial cause these parts to remain in adjusted relation when the device is removed from the work, thus providing a reading continued for subsequent observation or consideration.

The torque control provided by the slip clutches in the adjusting thimbles 69 and 85 is important, for when load is applied to effect penetration there is a tendency for the load to push the work away from the penetrator, deflecting even though slightly, the frame of the instrument in bending as a spring. Actual deflection of the frame as a spring under the applied major load will vary to the extent that the clamping effort has initially pre-loaded the frame before any other load is applied. By use of the torque control the initial load due to clamping and also the initial deflection produced are maintained always at a constant value, from which point the deflection of any given frame or support will always be the same under the same applied clamping effort. In the sense of the frame acting as a spring the deflection produced in it by each magnitude of major load is calibrated and those values retained as characteristics of individual instruments for appropriate major load. These values may be readily checked from time to time to insure the load spring is delivering the correct load to the penetrator.

Since the deflection of the instrument frame can be known as a constant amount for each major load applied, the instrument itself can be used to evaluate the amount of deflection produced in other bodies under the force of the various major loads and the load deflection characteristics of that body determined by means of the instrument. This is of special value in taking certain hardness readings on hollow parts when penetration and deflection are present at one and the same time.

By the substitution of a flat end for a pointed penetrator, all such deflections may be measured and the calibration values of the instrument rechecked at any time. With properly designed penetrators all the functions of the body which relate to its load deflection characteristics may be determined. These may include measurement of wall thickness of hollow sections, the bearing strength of certain materials, the tensile yield point of materials by determination of the fibre-stress existing in a sample at the point at which the stress-strain curve deviates from a straight line, and other such desirable and useful information.

The second, open face form of the instrument where the reference face is made the furthest protruding part, enables an almost unlimited variety of uses. Various forms of supplemental attachment means may be employed for fastening the instrument to large size objects and in contact with only the outside surface such, for example, as the side of a ship or the surface of an airplane wing.

While generally and as a matter of convenience termed a hardness tester, it will be appreciated that the invention is not by any means limited to that special use, and this and other expressions employed herein are therefore to be construed in a descriptive rather than in a limiting sense.

The hand screw constitutes the leverage means for effecting smooth, easy operation of the toggle and located in a position where it is accessible in all the various uses of the instrument and whether the instrument be used alone or mounted on a sub-base such as here disclosed. Similarly, the follower screw and dial operating knobs are conveniently located and readily operated in the different positions of use of the instrument.

The direct reading dial located as it is over the flat side of the instrument, may be made large enough to be easily read. This is a helpful feature in working in poorly lighted places.

What is claimed is:

1. An instrument in the nature of a hardness tester comprising a base, a penetrator operable on said base, a spring for urging said penetrator into engagement with material to be tested and toggle mechanism for effecting loading and unloading of said spring in respect to said penetrator, including toggle links joined in end-to-end relation and carrying a thrust block at the point of joinder, an anchorage support for the toggle links at one end, connecting means between the opposite end of the toggle links and the spring for applying the thrust of the toggle to or releasing it from said spring and leverage applying means connected between said thrust block and a stationary part of the base for effecting the thrust applying and releasing movements of said toggle links.

2. An instrument in the nature of a hardness tester comprising a base having a reference face for engagement with material to be tested, a penetrator mounted on the base in retractable and projectable relation to said reference face, a lever for projecting said penetrator, a spring for actuating said lever, pivotally connected toggle links pivoted on the base at one end and engaging said lever at the opposite end, a nut block at the pivotally connected ends of said toggle links and a loading and unloading screw connected with said nut block for effecting the thrust applying and releasing straightening and collapsing movements of said toggle links.

3. An instrument in the nature of a hardness tester comprising a base having a reference face for engagement with material to be tested, a penetrator mounted on the base in retractable and projectable relation to said reference face, a lever for projecting said penetrator, a spring for actuating said lever, pivotally connected toggle links pivoted on the base at one end and engaging said lever at the opposite end, a nut block at the pivotally connected ends of said toggle links and a loading and unloading screw connected with said nut block for effecting the thrust applying and releasing straightening and collapsing movements of said toggle links, an anchorage support for the end of said screw and links pivotally connected between said anchorage support and the end of the toggle links which is connected with said lever.

4. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw.

5. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut, a pivot link connecting the lever engaging end of said toggle links with the swivel support for said hand screw and a lever engaging roller on said lever engaging end of the toggle links.

6. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut, a pivot link connecting the lever engaging end of said toggle links with the swivel support for said hand screw, and a shiftable fulcrum for said lever for varying the magnitude of the load applied by the spring.

7. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said lever for projecting the penetrator including one lever member fulcrumed between its ends and acted on at one end by said spring and a second lever member fulcrumed intermediate its ends and having one end pivotally connected with the first lever member and the other end acting on said penetrator.

8. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said lever for projecting the penetrator including one lever member fulcrumed between its ends and acted on at one end by said spring and a second lever member fulcrumed intermediate its ends and having one end pivotally connected with the first lever member and the other end acting on said penetrator, and the lever engaging end of said toggle links having a roller bearing on said second lever member.

9. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said lever for projecting the penetrator including one lever member fulcrumed between its ends and acted on at one end by said spring and a second lever member fulcrumed intermediate its ends and having one end pivotally connected with the first lever member and the other end acting on said penetrator, and the fulcrum for said second lever member having an adjustable mounting on the base for varying the magnitude of spring loading applied to the penetrator.

10. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said base being in the form of a hollow frame containing said lever, said lever and hollow frame having registering fulcrum openings and a fulcrum pin insertable through the fulcrum openings in the hollow base into engagement with different fulcrum openings in the lever.

11. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, a follower screw for said penetrator, a worm gear having a screw seat for said follower screw, a worm for adjusting said worm gear and a dial driven by said worm for indicating advancing movements of said worm gear effected by said worm.

12. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, a follower screw for said penetrator, a worm gear having a screw seat for said follower screw, a worm for adjusting said worm gear, a dial driven by said worm for indicating advancing movements of said worm gear effected by said worm and torque control operating means for said follower screw and for said worm gear, respectively.

13. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said base being in the form of a hollow, flat-sided frame containing the parts described, a dial mounted on one of the flat sides of said frame and gearing for operating said dial extending transversely across between the sides of the frame.

14. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, a follower screw for said penetrator and locking means for said follower screw.

15. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, said base being of C clamp formation having jaw elements for holding a test piece in position for engagement by said penetrator and a second hand screw for effecting clamping and releasing movement on said jaw elements, said second hand screw having a fixed cross handle and a second cross handle having a torque wrench engagement with said first cross handle.

16. An instrument of the character disclosed comprising a base, a penetrator mounted on said base, a lever for projecting said penetrator, a loading spring acting on said lever, a hand screw, a swivel support for the end of said hand screw, a nut engaged on the intermediate portion of said hand screw, toggle links pivotally supported at one end and engaging said lever at the opposite end, said toggle links having their inner ends pivotally connected with said nut and a pivot link connecting the lever engaging end of said toggle links with the swivel support for said hand screw, a follower screw for the penetrator, a worm gear having a screw seat for said follower screw, a worm in engagement with said worm gear, a shaft carrying said worm and having a pinion at one end and an exposed operating knob at the opposite end, a gear journaled on the base in mesh with said pinion and an indicating dial carried by said gear.

17. An instrument of the character disclosed comprising a hollow base, a penetrator mounted on said base, leverage means mounted within the base for projecting said penetrator, a spring enclosed within the base for operating said leverage means, a toggle enclosed within the base and operatively connected with said leverage means, a hand screw for effecting operation of said toggle in opposite directions and a handle for turning said hand screw exposed at the outside of the hollow base.

18. An instrument of the character disclosed comprising a hollow base, a penetrator mounted on said base, leverage means mounted within the base for projecting said penetrator, a spring enclosed within the base for operating said leverage means, a toggle enclosed within the base and operatively connected with said leverage means, a hand screw for effecting operation of said toggle in opposite directions, a handle for turning said hand screw exposed at the outside of the hollow base, a sub-base for attaching said hollow instrument base to a surface for test and means for removably securing said instrument base on the sub-base with said toggle actuating handle accessible for effecting spring loading and unloading of the penetrator.

19. In an instrument of the character disclosed, a beam structure having means for attaching the same to a test surface and provided with a cradle, a surface testing instrument removably fitted in said cradle and means removably securing said instrument in said cradle.

20. In an instrument of the character disclosed, a beam structure having means for attaching the same to a test surface and provided with a cradle, a surface testing instrument removably fitted in said cradle and means removably securing said instrument in said cradle, said means for attaching the beam to the test surface including suction cups and means for actuating the same.

21. In an instrument of the character disclosed, a beam structure having means for attaching the same to a test surface and provided with a cradle, a surface testing instrument removably fitted in said cradle and means removably securing said instrument in said cradle, said means for attaching the beam to the test surface including suction cups and means for actuating the same, and micrometer means on said beam for indicating adjustment effected by said means.

22. In an instrument of the character disclosed, a beam structure having means for attaching the same to a test surface and provided with a cradle, a surface testing instrument removably fitted in said cradle and means removably securing said instrument in said cradle, said attaching means being magnetic in character.

23. An instrument of the character disclosed comprising a hollow casing having a protruding reference face and openings for securing means at opposite sides of the same, a penetrator within the casing and projectable beyond said reference face, spring means within said casing for effecting projection of said penetrator and means within the casing for effecting the spring loading and unloading of said penetrator and including a handle at the outside of the casing accessible when the casing is attached to a test surface through the medium of the openings aforesaid.

MILTON A. CHESTER.

References Cited in the file of this patent

UNITED STATES PATENTS

| Number | Name | Date |
|---|---|---|
| 2,448,486 | Chester | Aug. 31, 1948 |

FOREIGN PATENTS

| Number | Country | Date |
|---|---|---|
| 184,817 | Germany | Apr. 2, 1907 |